United States Patent Office 2,709,857
Patented June 7, 1955

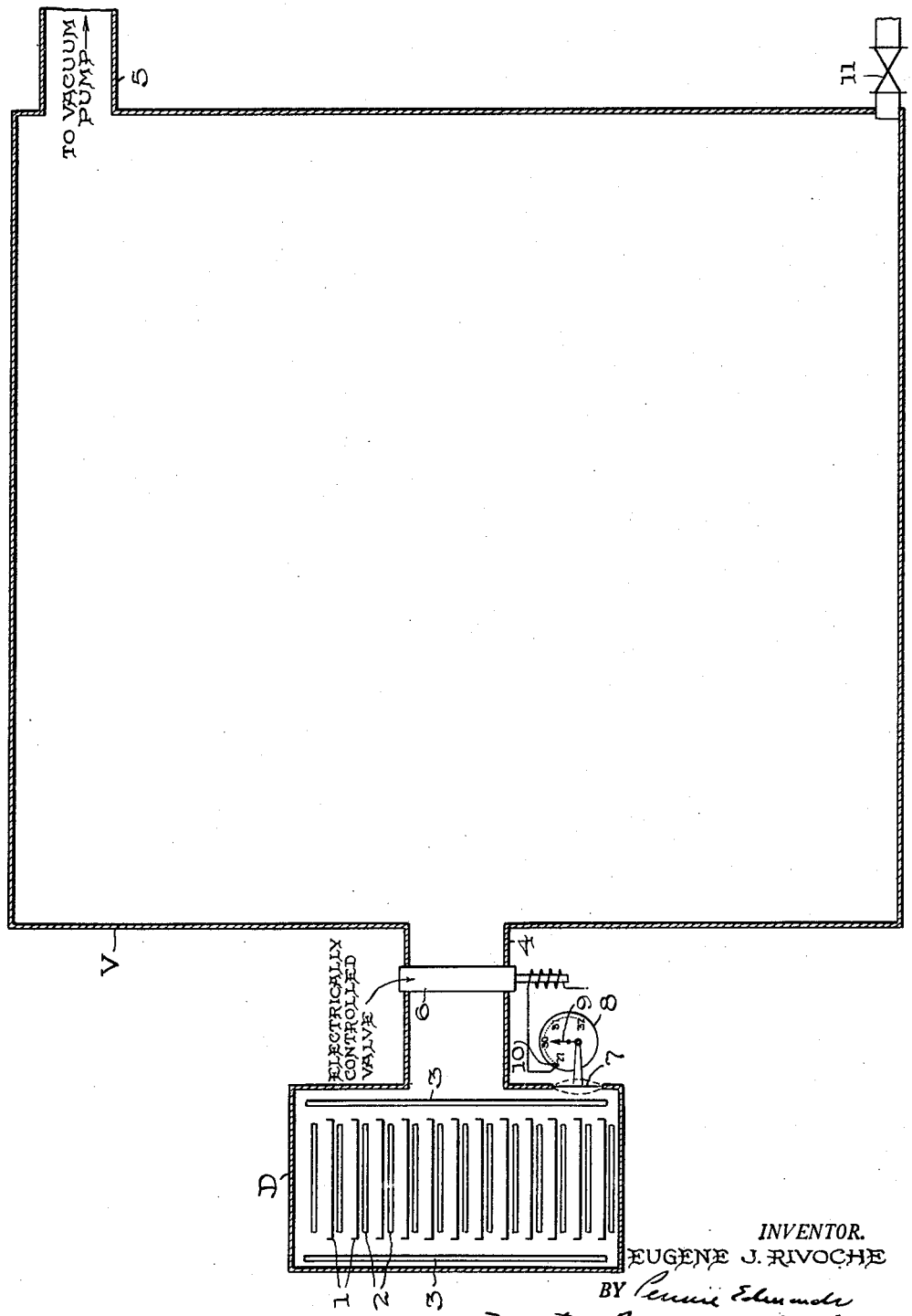

---

2,709,857

APPARATUS FOR TREATING FOOD PRODUCTS

Eugene J. Rivoche, Washington, D. C.

Application March 9, 1951, Serial No. 214,732
In France October 11, 1941

Section 1, Public Law 690, August 8, 1946
Patent expires October 11, 1961

3 Claims. (Cl. 34—51)

This invention relates to apparatus for the treatment of food products and particularly to apparatus for use in the preparation of readily reconstitutable, dehydrated food products.

The apparatus is useful in connection with the dehydration of various kinds of food products, such as vegetables, for example, peas, carrots, cabbage, string beans, lima beans, potatoes, asparagus, etc.; fruits, for example, peaches, apricots, plums, apples, etc.; berries, for example, strawberries, blackberries, gooseberries, etc.; meats and fish.

In the usual methods of dehydrating food products of various kinds, the heat to bring about the evaporation of the moisture content thereof is effective from the outside inwardly, so that evaporation of moisture first takes place at the surface and gradually proceeds inwardly of the food product. This results in the product undergoing dehydration losing most of its heat so that the inside of the product is affected less by the source of heat than the surface portions thereof. This, in turn, results in a greater drying effect on the surface or skin of the food product, and frequently, the formation of a hard crust on the outer surface of the product.

In accordance with this invention, the heat which brings about the evaporation and removal of the moisture from the food product is effective from the inside of the product outwardly, so that there is no undue heating of the surface portions of the food product such as would result in the formation of a hard surface crust. Consequently, dehydration of the food product is substantially uniform throughout, and the resultant product is one which readily is reconstitutable by absorption of water to give a reconstituted product which compares most favorably with the original product in appearance, taste, flavor, etc.

More specifically, the present invention involves apparatus in which the food product to be dehydrated is heated throughout, and thereafter alternately subjecting it to sudden drops of pressure and further heating. The drop in pressure should be sufficient to lower the pressure to which the food product is subjected to an extent such that the moisture of the heated product is above its boiling point at the reduced pressure, so that a portion of it will flash into steam and escape from the product. The steam in escaping from the food product permeates the cellular structure and the outer surface or skin thereof, and forms perforations or fissures in the outer surface or skin through which moisture readily will pass. The drop in pressure should not be sufficient to cause a disruption or bursting of the food product by the escaping steam, but it should be sufficient to produce a porous, cellular structure, the outer surface of which is perforated or fissured so that moisture may readily pass therethrough. The flashing of a portion of the moisture of the food product into steam results in a lowering of the temperature thereof. The food product is again heated to the desired temperature, and the pressure again suddenly dropped to bring about the conversion of more of the moisture content of the product to steam and its escape therefrom. This cycle of operations is repeated until the desired degree of dehydration of the food product is obtained.

In carrying out the invention, the food product to be dehydrated is placed in any suitable closed drying chamber and heated to a predetermined temperature, which may vary from about 70° F. (room temperature) to 350° F. Such heating may be by direct heating or by radiation, and may be obtained by open-flame burners, heated coils or electric heaters, including infra-red and high-frequency heaters, or by any combination of such heating sources. Advantageously the heating of the food product is obtained by placing it on a heated plate and simultaneously subjecting it to infra-red and high-frequency electric heating, since a combination of such heating means has been found to be most effective in bringing the food product to the desired temperature in the shortest period of time.

The heating of the food product should never be such as to carbonize or otherwise deleteriously affect it, and normally it is preferred to heat it to temperatures between 80° F. and 150° F.

After the food product has been heated to the desired extent the pressure to which it is subjected is suddenly reduced to a point at which the temperature of the moisture content of the food product is above its boiling point at the reduced pressure, so that a portion of the moisture content will flash into steam and escape from the food product. Such reduction in the pressure to which the heated food product is subjected may be obtained in any way, and advantageously may be obtained by having the chamber in which the food is being dehydrated connected to a much larger highly evacuated chamber and by opening the passage from the dehydrating chamber to the highly evacuated chamber so that on equalization of the pressures in the two chambers the desired reduction of the pressure in the dehydrating chamber will be obtained. In such a case most of the moisture which escapes from the food product in the form of steam will be transferred to the vacuum chamber, and thus removed from the dehydrating chamber.

After the food product has been subjected to the reduced pressure for a period of from about five to twenty seconds, and preferably from ten to twelve seconds, which period will be sufficient to bring about the removal of the desired amount of moisture from the food product at that time, and to result in the lowering of the temperature of the moisture content remaining in the food product to that corresponding to its boiling point at the reduced pressure, due to the cooling effect of the vaporization of a portion of the moisture therefrom, the communication between the two chambers is closed and the food product is again heated to the predetermined degree. Such heating results in an increase of the pressure in the dehydrating chamber due to a gradual vaporization of some of the moisture from the food product due to the low pressure still existing in the dehydrating chamber, and the heating of the food product to again restore it to a predetermined temperature prior to a subsequent drop of the pressure in the dehydrating chamber, which predetermined temperature may correspond to the boiling point of moisture of the food product at the increased (but still negative) pressure in the dehydrating chamber. The pressure to which the food product is subjected is again lowered to bring about the flash generation of more of the moisture content of the food product into steam and its escape from the food product. This cycle of operations is continued until the food product is dehydrated to the desired extent. The number of cycles which will be required to bring about the desired dehydration will depend upon the moisture content of the food product, the temperature to which it is heated, the extent to which the pressure thereon is reduced during each cycle of operation, and the size of the particles of the food product. As only a small portion of the moisture of the food product is removed during any one cycle of operation, it may be necessary to subject the food product to several hundred or even a thousand or more cycles to bring about the desired degree of dehydration.

Normally it is desired to continue the above cyclic treatment of the food product until it is thoroughly dehydrated, that is, until the moisture content remaining in the food product is only from about 5% to 12% of the original moisture content of the food product, or in some instances, as in the dehydration of carrots, until the moisture content is approximately 15% of the original moisture content thereof. However, in some instances it may be desirable to carry out the dehydration of the food product as just described until only a portion of the moisture is removed from the food product and to thereafter subject the food product to dehydration in other known ways. When the invention is thus utilized as a preconditioning treatment of the food product for a subsequent dehydration treatment, it may be sufficient to subject the food product to only a relatively few cycles involving the heating of the food and the lowering of the pressure thereon to bring about a partial removal of the moisture content. Such a preconditioning treatment of the food product prior to subjecting it to dehydration by other known means is desirable in that the flash generation of the moisture content of the food product into steam will cause a perforating or fissuring of at least the outer surface or skin of the food product, which, during any subsequent dehydration operation, will facilitate the removal of the remaining moisture from the food product.

As the heat to which the food product is subjected penetrates to the inside thereof, and the vaporization and removal of the moisture takes place internally of the food product and forces its way to the surface thereof, there is no excessive overheating of the outer skin or surface of the food product, and, consequently, no hard crusts are formed thereon which would interfere with the removal of moisture from the food product and otherwise be undesirable.

The extent to which the cells of the food product are disrupted during dehydration as described above may be controlled, within limits, by the extent of the reduction of pressure to which the food product is subjected during the dehydration cycles, and the temperature to which the food product is heated before the pressure thereon is reduced.

In some instances, such as in the dehydration of vegetables to be used in soups, where it is desired to get the taste and flavor into the soup as rapidly as possible, or where a soft structure is desired, a disruption of the cells or a breaking down of the cellulosic structure of the food product is desirable. In the case of meats, for example, the disruption of the cells and the breaking down of the fibrous structure has a tenderizing effect on the meat. In the case of most starchy vegetables, such as potatoes, lima beans, peas, etc., a disruption of the cells ordinarily is not desired, except where they are to be used in soups or in the making of thickening compounds.

The carrying out of the dehydration of the food products in the manner described above may be carried out in an apparatus such as is diagrammatically illustrated in the accompanying drawing.

Referring to the drawing, the food product to be dehydrated is placed in a dehydrating chamber D, preferably by placing it in trays 1 which may be heated by steam coils, electric heaters or otherwise, if desired. To further assist in the heating of the food during the dehydration operation infra-red heaters 2 preferably are arranged over the food in each tray and dielectric heating electrodes 3 for heating the food product by high-frequency heating may extend along opposite sides of the food trays.

The dehydrating chamber is in communication with a vacuum chamber V by means of a suitable passageway 4.

A conduit 5 extends from the vacuum chamber to a vacuum pump which will maintain a high degree of vacuum, for example, a vacuum of 30 to 32 inches of mercury, in the vacuum chamber.

The passageway 4 connecting the dehydrating and vacuum chambers normally is closed by an automatically-operated valve 6 which may be of any well-known type but preferably is a solenoid or other electrically-operated valve. The operation of the automatic valve 6 is controlled by a pressure and time-controlled mechanism comprising a pressure-actuated diaphragm 7 which is subject to the pressure within the dehydrating chamber D, and a time-controlled mechanism 8. A needle 9 of the time-controlled mechanism is so connected to the pressure diaphragm 7 that when the pressure in the dehydrating chamber reaches a predetermined degree, such as that corresponding to 27 inches of mercury, the diaphragm is bulged outwardly and causes the needle 9 to contact with an electrical contact 10 which closes the circuit including the solenoid valve 6, so that that valve is opened and communication thereby established between the dehydrating chamber D and the high vacuum chamber V.

As soon as the dehydrating chamber has been placed into communication with the high vacuum chamber, the equalization of the pressure will result in a sudden drop of the pressure in the dehydrating chamber equivalent to a few inches of mercury with resultant flash generation of a portion of the heated moisture in the food product into steam and its removal from the food product. The drop in pressure also restores the needle 9 to its normal position in which it is out of contact with the contact 10. The time-controlled mechanism 8 is such that the circuit to the valve 6 is not immediately broken and the valve remains open for a predetermined period, such as for a period of ten to twelve seconds, during which time steam generated in the food product and removed therefrom passes into the vacuum chamber. Such steam which does not condense is removed through the conduit 5 leading to the exhaust pump and discharged by it to the atmosphere, or condensed in an appropriate condenser. The water resulting from the condensation of any steam in the vacuum chamber may be withdrawn through a valve-controlled discharge pipe 11.

The time-controlled mechanism will be so set as to bring about a closing of the valve 6 while there is sufficient heat remaining in the food product, which together with the heat supplied by the heating means in the dehydrating chamber, will bring about a gradual conversion of some of the moisture in the food product into steam. Such steam gradually raises the pressure in the dehydrating chamber until the pressure therein again is sufficient to cause the needle 9 of the time-controlled mechanism to close the circuit including the valve 6 so that that valve again is opened and the cycle repeated. The heating of the food product after each reduction of pressure will be such that its temperature will have increased to a predetermined amount before the pressure in the dehydrating chamber has reached a point sufficient to bring about actuation of the valve 6. Consequently, the actuation of the valve is controlled by the temperature to which the food product is raised, as well as by the pressure within the dehydrating chamber. Such cyclic operation is continued until the food product is dehydrated to the desired extent, that is, until it is completely dehydrated, or until it is only partially dehydrated, as desired.

The size of the high vacuum chamber should be much larger, for example, 10 to 30 times or more greater than the volume of the dehydration chamber so that when the valve 6 is opened the drop in pressure in the chamber D will be sufficient to bring about the desired flash vaporization of a portion of the moisture content of the food product. However, the relative sizes of the two chambers should not be such that the drop in pressure will be so great as to bring about a disruption or bursting of the food product. It is sufficient that the drop in pressure shall be such as to cause such an energetic vaporization of a portion of the moisture content that it will permeate and perforate or form fissures in the outer surface or skin of the food product such as will enable the ready passage of moisture from the inside of the food product during its dehydration, and the ready passage of water back into the food product when it subsequently is being reconstituted.

While, as indicated above, the heating of the food product may be obtained in any manner, the use of dielectric heating is preferred.

If the food product is heated by high frequency dielectric heating, and one part dries more quickly than another part, its electrical conductivity diminishes and it receives less current, and, therefore, is heated to a less extent, all other conditions remaining the same. Consequently, other parts of the food product which have not been dried to such an extent will be heated more strongly, and, therefore, dry faster. Hence, an automatic regulation of the heating is obtained when high-frequency dielectric heating is used which causes the heat to be distributed uniformly throughout the whole of the food product undergoing dehydration, and without the formation of crusts or pellicles at the surface which would interfere with the dehydration of the food and otherwise be objectionable.

Since the conductivity of the food product undergoing treatment is governed by its moisture content, the product, when dehydrated by high-frequency dielectric heating, will never become completely dry, but its moisture content can be reduced to approximately 30 to 40%, according to the voltage used. Such a half dry product is no longer fragile, does not adhere to the walls of receptacles in which it is placed, and does not stick together. It subsequently may be further dried to the desired degree without special precautions.

A still further advantage of using high-frequency dielectric heating is that the dehydration of the foodstuff can be accomplished in vacuum as well as under normal atmospheric pressure.

The use of high-frequency dielectric heating is particularly advantageous in layer drying, where the food product being treated is arranged in alternate dried or partially dried and raw or freshly cooked material, since the wet layers, having greater electrical conductivity, will receive a greater amount of the current, and, consequently, will dry at a more rapid rate.

Various changes may be made in the method of dehydrating the food products as described above or the apparatus used therefor without departing from the scope of the invention, or sacrificing any of the advantages thereof.

This application is a continuation-in-part of application Serial No. 10,914, filed February 25, 1948, now abandoned.

I claim:

1. Apparatus for dehydrating food products comprising a normally-closed dehydrating chamber, a vacuum chamber of substantially larger volume communicating with said dehydrating chamber, valve means controlling communication between said dehydrating and said vacuum chambers, means responsive to pressure changes in said dehydrating chamber, said means opening said valve upon an increase of pressure in said dehydrating chamber, and means for closing said valve means after the pressures in said chambers have been equalized.

2. Apparatus for dehydrating food products as defined in claim 1 in which the means for closing said valve after the pressures in said chambers have been equalized is time controlled.

3. Apparatus for dehydrating food products as defined in claim 1 which includes means for supplying heat to a food product in the dehydrating chamber.

References Cited in the file of this patent

UNITED STATES PATENTS

| Number | Name | Date |
|---|---|---|
| 827,730 | Jones | Aug. 7, 1906 |
| 884,288 | Nash | Apr. 7, 1908 |
| 2,023,536 | Moore | Dec. 10, 1935 |
| 2,091,372 | Moore | Aug. 31, 1937 |
| 2,110,184 | Webb | Mar. 8, 1938 |
| 2,132,897 | Gentele | Oct. 11, 1938 |
| 2,148,696 | Kampfer | Feb. 28, 1939 |
| 2,171,921 | Duval et al. | Sept. 5, 1939 |
| 2,284,913 | McComb | June 2, 1942 |
| 2,329,600 | Freund | Sept. 14, 1943 |

FOREIGN PATENTS

| Number | Country | Date |
|---|---|---|
| 974,574 | France | Feb. 23, 1951 |